(12) United States Patent
Song et al.

(10) Patent No.: US 10,117,007 B2
(45) Date of Patent: Oct. 30, 2018

(54) ROUTING NODE, OPTICAL SWITCHING NETWORK, AND OPTICAL SIGNAL TRANSMISSION METHOD

(71) Applicant: Huawei Technologies Co., Ltd., Shenzhen (CN)

(72) Inventors: Liang Song, Hangzhou (CN); Wei Zhang, Munich (DE); Qinfen Hao, Beijing (CN)

(73) Assignee: Huawei Technologies Co.., Ltd., Shenzhen (CN)

( * ) Notice: Subject to any disclaimer, the term of this patent is extended or adjusted under 35 U.S.C. 154(b) by 0 days.

(21) Appl. No.: 15/407,441

(22) Filed: Jan. 17, 2017

(65) Prior Publication Data

US 2017/0127161 A1  May 4, 2017

Related U.S. Application Data

(63) Continuation of application No. PCT/CN2014/082460, filed on Jul. 18, 2014.

(51) Int. Cl.
*H04Q 11/00* (2006.01)
*H04L 12/931* (2013.01)
(Continued)

(52) U.S. Cl.
CPC ..... *H04Q 11/0071* (2013.01); *H04L 49/1576* (2013.01); *H04L 49/357* (2013.01);
(Continued)

(58) Field of Classification Search
CPC .......... H04Q 11/0003; H04Q 11/0005
See application file for complete search history.

(56) References Cited

U.S. PATENT DOCUMENTS 5,309,266 A * 5/1994 Jacob ................... H04L 12/5601
398/50
6,559,989 B1 5/2003 Kim et al.
(Continued)

FOREIGN PATENT DOCUMENTS

CN 101778047 A 7/2010
CN 102006226 A 4/2011
(Continued)

OTHER PUBLICATIONS

Foreign Communication From a Counterpart Application, European Application No. 14897878.6, Extended European Search Report dated Jul. 17, 2017, 9 pages.
(Continued)

*Primary Examiner* — Shi K Li
(74) *Attorney, Agent, or Firm* — Conley Rose, P.C.

(57) ABSTRACT

A routing node includes: at least one optical buffer, a switching node, and at least one transmission waveguide, where an output end of each optical buffer is connected to an input end of the switching node; each transmission waveguide is connected to an output end of the switching node. The optical buffer is configured to parse a received optical signal to obtain an identifier of a destination routing node, and send the identifier to the switching node. The switching node determines whether an output port required by the destination routing node is in an idle state or a busy state; and control the optical buffer to store the optical signal if the output port is in a busy state; or send the optical signal to the destination routing node if the output port is in an idle state.

17 Claims, 6 Drawing Sheets

(51) Int. Cl.
*H04L 12/933* (2013.01)
*H04L 12/935* (2013.01)

(52) U.S. Cl.
CPC ...... *H04Q 11/0003* (2013.01); *H04L 49/3018* (2013.01); *H04Q 2011/002* (2013.01); *H04Q 2011/0073* (2013.01)

(56) References Cited

U.S. PATENT DOCUMENTS

| | | | |
|---|---|---|---|
| 6,724,752 B1* | 4/2004 | Turtiainen | H04M 7/063 370/352 |
| 6,810,211 B1* | 10/2004 | Castanon | H04J 14/0227 398/47 |
| 2002/0104058 A1* | 8/2002 | Rappaport | H03M 13/03 714/784 |
| 2005/0053375 A1 | 3/2005 | Yoo et al. | |
| 2006/0221948 A1 | 10/2006 | Benner et al. | |
| 2007/0242691 A1 | 10/2007 | Rhee et al. | |
| 2011/0052192 A1 | 3/2011 | Small et al. | |
| 2011/0069963 A1* | 3/2011 | McLaren | G02B 6/12007 398/115 |
| 2012/0087375 A1* | 4/2012 | Rhee | H04L 49/101 370/401 |
| 2016/0301996 A1* | 10/2016 | Morris | H04L 47/00 |

FOREIGN PATENT DOCUMENTS

| | | |
|---|---|---|
| CN | 102027399 A | 4/2011 |
| CN | 103107943 A | 5/2013 |
| CN | 103685078 A | 3/2014 |

OTHER PUBLICATIONS

Machine Translation and Abstract of Chinese Publication No. CN101778047, Jul. 14, 2010, 5 pages.

Foreign Communication From a Counterpart Application, PCT Application No. PCT/CN2014/082460, English Translation of International Search Report dated Apr. 24, 2015, 2 pages.

Foreign Communication From a Counterpart Application, PCT Application No. PCT/CN2014/082460, English Translation of Written Opinion dated Apr. 24, 2015, 7 pages.

Machine Translation and Abstract of Chinese Publication No. CN102027399, Apr. 20, 2011, 8 pages.

Foreign Communication From a Counterpart Application, Chinese Application No. 201480038007.0, Chinese Office Action dated Mar. 23, 2018, 6 pages.

* cited by examiner

ROUTING NODE, OPTICAL SWITCHING NETWORK, AND OPTICAL SIGNAL TRANSMISSION METHOD

CROSS-REFERENCE TO RELATED APPLICATIONS

This application is a continuation application of international patent application number PCT/CN2014/082460 filed on Jul. 18, 2014, which is incorporated by reference.

TECHNICAL FIELD

The present disclosure relates to the field of silicon photonics technologies, and in particular, to a routing node, an optical switching network, and an optical signal transmission method.

BACKGROUND

With an increase in a quantity of cores of a processor-on-chip, a network-on-chip is gradually applied to a system-on-chip. Because an optical interconnection has a higher bandwidth, lower power consumption, a shorter latency, and smaller crosstalk and electromagnetic interference, an optical network-on-chip based on an optical interconnection manner emerges as the time requires. The optical network-on-chip includes at least one routing node. Each routing node may be connected to one device. The device may download an optical signal from the optical network-on-chip using the routing node to which the device is connected, and the device may upload an optical signal to the optical network-on-chip using the routing node to which the device is connected.

In some approaches, a routing node is provided. Referring to FIG. 1, the routing node includes: a beam splitter 101, an optical delay unit 102, a wavelength division demultiplexer 103, a tunable wavelength converter 104, a wavelength router 105, a first variable multi-wavelength optical buffer unit 106, a second variable multi-wavelength optical buffer unit 107, a wavelength division multiplexer 108, a feedback waveguide delay loop 109, and a control unit 110. One end of the beam splitter 101 is connected to a device, and another end of the beam splitter 101 is connected to one end of the optical delay unit 102. Another end of the optical delay unit 102 is connected to one end of the wavelength division demultiplexer 103, and another end of the wavelength division demultiplexer 103 is connected to one end of the tunable wavelength converter 104. Another end of the tunable wavelength converter 104 is connected to one end of the wavelength router 105, and another end of the wavelength router 105 is connected to one end of the first variable multi-wavelength optical buffer unit 106. Another end of the first variable multi-wavelength optical buffer unit 106 is connected to one end of the wavelength division multiplexer 108, and another end of the wavelength division multiplexer 108 is connected to a next routing node. Another end of the wavelength router 105 is further connected to one end of the second variable multi-wavelength optical buffer unit 107, and another end of the second variable multi-wavelength optical buffer unit 107 is connected to one end of the feedback waveguide delay loop 109. Another end of the feedback waveguide delay loop 109 is connected to one end of the tunable wavelength converter 104. Another end of the beam splitter 101 is further connected to one end of the control unit 110, and another end of the control unit 110 is connected to one end of the tunable wavelength converter 104.

An optical signal transmission method based on the routing node provided in some approaches is: An optical signal is transmitted to the beam splitter 101. The beam splitter 101 divides the optical signal into a first optical signal and a second optical signal, and transmits the first optical signal to the control unit 110 and transmits the second optical signal to the optical delay unit 102. The optical delay unit 102 lowers a transmission rate of the second optical signal, and transmits the second optical signal to the wavelength division demultiplexer 103. The wavelength division demultiplexer 103 transmits the second optical signal to the tunable wavelength converter 104. The control unit 110 parses the first optical signal, to acquire an identifier of a destination routing node of the optical signal. The control unit 110 determines, according to the identifier of the destination routing node, whether an output port required by the destination routing node is currently in an idle state or a busy state. If the control unit 110 determines that the output port required by the destination routing node is in a busy state, the control unit 110 sends a first control signal to the tunable wavelength converter 104, such that the tunable wavelength converter 104 adjusts a wavelength of the second optical signal to a wavelength required by the second variable multi-wavelength optical buffer unit 107 and transmits the adjusted second optical signal to the wavelength router 105. The wavelength router 105 transmits the adjusted second optical signal to the second variable multi-wavelength optical buffer unit 107. The second variable multi-wavelength optical buffer unit 107 transmits the adjusted second optical signal to the feedback waveguide delay loop 109, such that the second optical signal is circularly stored in the feedback waveguide delay loop 109. When the output port required by the destination routing node of the optical signal is in an idle state, the control unit 110 sends a second control signal to the tunable wavelength converter 104, such that the tunable wavelength converter 104 adjusts a wavelength of the second optical signal to a wavelength required by the first variable multi-wavelength optical buffer unit 106 and transmits the adjusted second optical signal to the wavelength router 105. The wavelength router 105 transmits the adjusted second optical signal to the first variable multi-wavelength optical buffer unit 106. The first variable multi-wavelength optical buffer unit 106 transmits the adjusted second optical signal to the wavelength division multiplexer 108. The wavelength division multiplexer 108 transmits the adjusted second optical signal to the destination routing node.

In a process of implementing the present disclosure, the inventor finds that some approaches have at least the following problem:

Because the control unit 110 has control and arbitration functions, design for circuits in the control unit 110 is complex. Moreover, excessive complex components are used in the routing node, which does not facilitate integration on a single chip.

SUMMARY

To resolve a problem in some approaches, the present disclosure provides a routing node, an optical switching network, and an optical signal transmission method. The technical solutions are as follows:

According to a first aspect, the present disclosure provides a routing node, where the routing node includes: at least one optical buffer, a switching node, and at least one transmission waveguide, where a quantity of optical buffers is the same as a quantity of transmission waveguides; an output end of each optical buffer of the at least one optical buffer is connected to an input end of the switching node, and each transmission waveguide of the at least one transmission waveguide is connected to an output end of the switching node; the optical buffer receives an optical signal, and parses the optical signal, to obtain an identifier of a destination routing node; and sends the identifier of the destination routing node to the switching node; and the switching node determines, according to the identifier of the destination routing node, whether an output port required by the destination routing node is currently in an idle state or a busy state; and if the output port is in a busy state, the switching node controls the optical buffer to store the optical signal, and until the output port required by the destination routing node changes to be in an idle state, the switching node sends the optical signal stored in the optical buffer to the destination routing node using a transmission waveguide corresponding to the output port required by the destination routing node; or if the output port is in an idle state, the switching node sends the optical signal received by the optical buffer to the destination routing node using a transmission waveguide corresponding to the output port required by the destination routing node.

According to a second aspect, the present disclosure provides an optical signal transmission method, where the method includes: receiving an optical signal using an optical buffer, and parsing the optical signal, to obtain an identifier of a destination routing node; determining, according to the identifier of the destination routing node, whether an output port required by the destination routing node is currently in an idle state or a busy state; and if it is determined that the output port required by the destination routing node is in a busy state, storing the optical signal in the optical buffer, and until the output port required by the destination routing node changes to be in an idle state, sending the optical signal stored in the optical buffer to the destination routing node using a transmission waveguide corresponding to the output port required by the destination routing node; or if it is determined that the output port required by the destination routing node is in an idle state, sending the optical signal to the destination routing node using a transmission waveguide corresponding to the output port required by the destination routing node.

According to a third aspect, the present disclosure provides an optical switching network, where the optical switching network includes multiple routing nodes and a transmission waveguide, where the routing node is the routing node according to the first aspect, and the multiple routing nodes are interconnected using the transmission waveguide, to form a required topology structure.

In embodiments of the present disclosure, a routing node includes a switching node and an optical buffer, and relatively few components are required, which facilitates integration on a single chip. Moreover, in the routing node, the optical buffer performs parsing to obtain an identifier of a destination routing node, and the switching node determines whether an output port required by the destination routing node is currently in an idle state or a busy state, thereby implementing separation of control from arbitration, and simplifying circuit complexity of the switching node and the optical buffer.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

To make the objectives, technical solutions, and advantages of the present disclosure clearer, the following further describes the embodiments of the present disclosure in detail with reference to the accompanying drawings.

Embodiment 1

Figure 1:
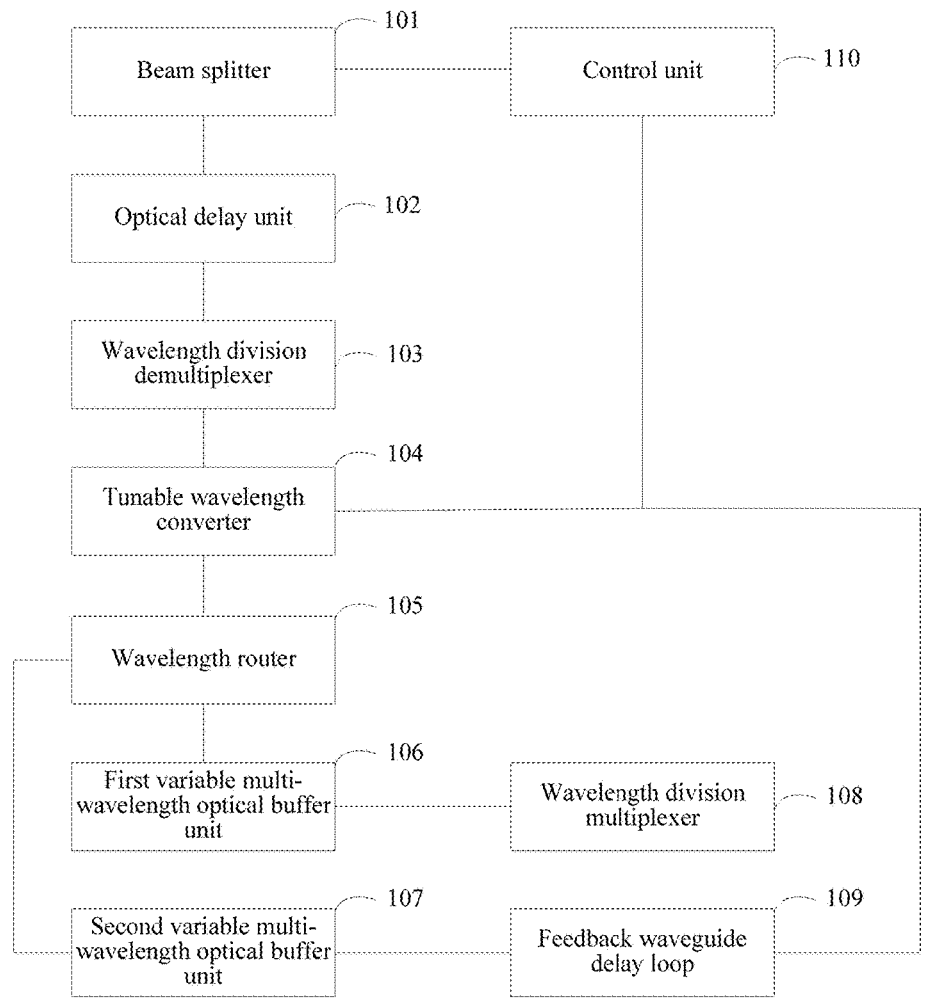
FIG. 1 is a schematic structural diagram of a routing node provided in Background.
Figure 2:
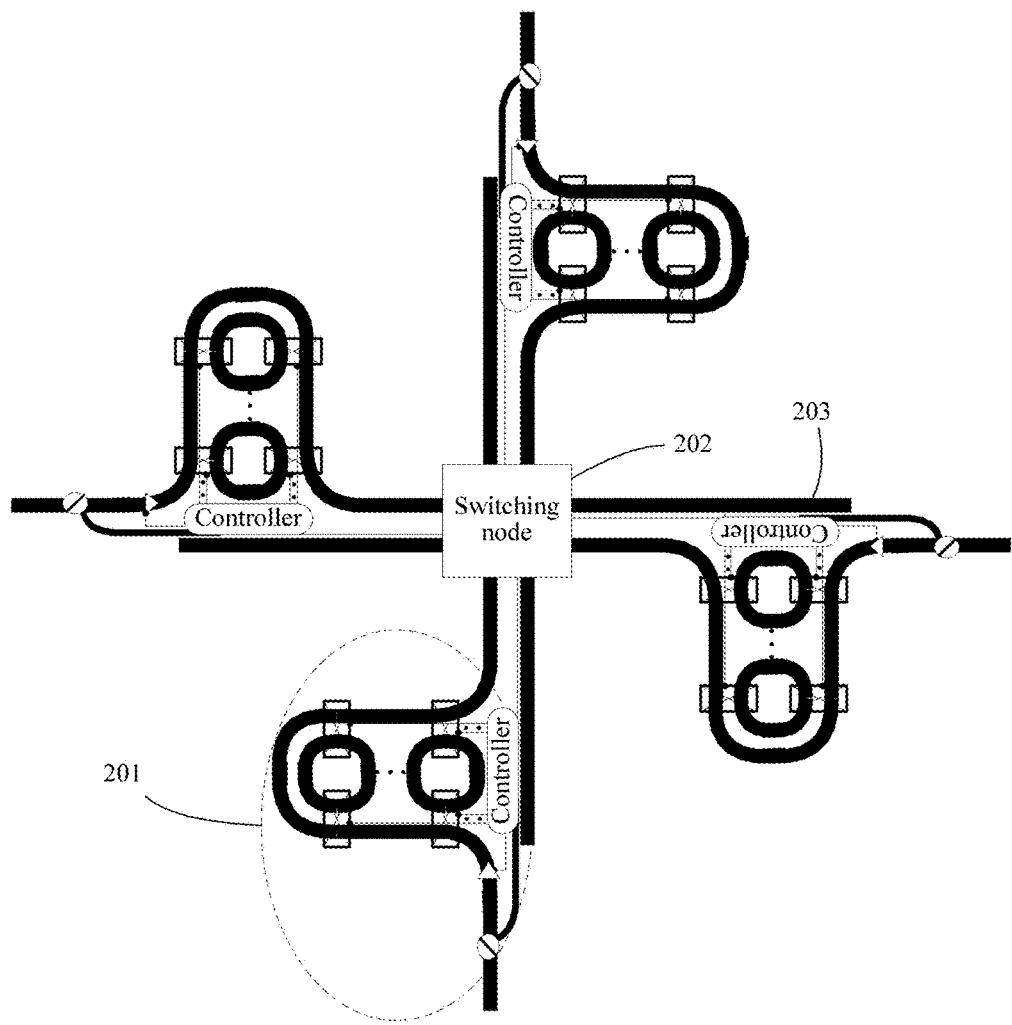
FIG. 2 is a schematic structural diagram of a routing node according to Embodiment 1 of the present disclosure.

This embodiment of the present disclosure provides a routing node. Referring to FIG. 2, the routing node includes: at least one optical buffer 201, a switching node 202, and at least one transmission waveguide 203, where a quantity of optical buffers 201 is the same as a quantity of transmission waveguides 203; an output end of each optical buffer 201 of the at least one optical buffer 201 is connected to an input end of the switching node 202, and each transmission waveguide 203 of the at least one transmission waveguide 203 is connected to an output end of the switching node 202; the optical buffer 201 receives an optical signal, and parses the optical signal, to obtain an identifier of a destination routing node; and sends the identifier of the destination routing node to the switching node 202; and the switching node 202 determines, according to the identifier of the destination routing node, whether an output port required by the destination routing node is currently in an idle state or a busy state; and if the switching node 202 determines that the output port required by the destination routing node is in a busy state, the switching node 202 controls the optical buffer 201 to store the optical signal, and until the output port required by the destination routing node changes to be in an idle state, the switching node 202 sends the optical signal stored in the optical buffer 201 to the destination routing node using a transmission waveguide 203 corresponding to the output port required by the destination routing node; or if the switching node 202 determines that the output port required by the destination routing node is in an idle state, the switching node 202 sends the optical signal received by the optical buffer 201 to the destination routing node using a transmission waveguide 203 corresponding to the output port required by the destination routing node.

Preferably, the switching node 202 determines, according to the identifier of the destination routing node, whether the output port required by the destination routing node currently has a transmission task; and if the switching node 202 determines that the output port required by the destination routing node has no transmission task, the switching node 202 determines that the output port required by the destination routing node is currently in an idle state, and sends a transmission instruction to the optical buffer 201. The optical buffer 201 receives the transmission instruction sent by the switching node 202 and sends the received optical signal to the switching node 202 according to the transmission instruction. The switching node 202 receives the optical signal that is received and that is sent by the optical buffer 201 and sends the received optical signal to the transmission waveguide 203 corresponding to the output port required by the destination routing node. The transmission waveguide 203 corresponding to the output port required by the destination routing node receives the optical signal that is received and that is sent by the switching node 202, and sends the received optical signal to the destination routing node.

If the switching node 202 determines that the output port required by the destination routing node has a transmission task, the switching node 202 determines that the output port required by the destination routing node is currently in a busy state, and sends a storage instruction to the optical buffer 201. The optical buffer 201 receives the storage instruction sent by the switching node 202 and stores the optical signal in the optical buffer 201 according to the storage instruction. Until the switching node 202 determines that the output port required by the destination routing node changes to be in an idle state, the switching node 202 sends a transmission instruction to the optical buffer 201. The optical buffer 201 receives the transmission instruction sent by the switching node 202, acquires the stored optical signal, and sends the stored optical signal to the switching node 202. The switching node 202 receives the optical signal that is stored in and that is sent by the optical buffer 201 and sends the stored optical signal to the transmission waveguide 203 corresponding to the output port required by the destination routing node. The transmission waveguide 203 corresponding to the output port required by the destination routing node receives the optical signal that is stored in and that is sent by the switching node 202 and sends the optical signal to the destination routing node.

Preferably, the switching node 202 generates a transmission task according to an identifier of a signal source and the identifier of the destination routing node, adds the transmission task to a task table, and determines whether the transmission task is the same as another transmission task in the task table except the transmission task. If the transmission task is the same as another transmission task in the task table except the transmission task, the switching node 202 determines that the output port required by the destination routing node currently has a transmission task. If the transmission task is not the same as another transmission task in the task table except the transmission task, the switching node 202 determines that the output port required by the destination routing node currently has no transmission task.

"Currently" refers to a current timeslot.

Further, the switching node 202 includes: an arbiter and a switching switch; the output end of each optical buffer 201 is connected to an input end of the arbiter, an output end of the arbiter is connected to one end of the switching switch, the output end of each optical buffer 201 is further connected to one end of the switching switch, and another end of the switching switch is connected to each transmission waveguide 203; and the arbiter receives the identifier of the destination routing node sent by the optical buffer 201, and determines, according to the identifier of the destination routing node, whether the output port required by the destination routing node is currently in an idle state or a busy state; and if the output port is in a busy state, the arbiter controls the optical buffer 201 to store the optical signal, and until the output port required by the destination routing node changes to be in an idle state, the arbiter controls the switching switch to send the optical signal stored in the optical buffer 201 to the destination routing node using the transmission waveguide 203; or if the output port is in an idle state, the arbiter controls the switching switch to send the optical signal received by the optical buffer 201 to the destination routing node using the transmission waveguide 203.

Preferably, the arbiter determines, according to the identifier of the destination routing node, whether the output port required by the destination routing node currently has a transmission task. If the arbiter determines that the output port required by the destination routing node has no transmission task, the arbiter determines that the output port required by the destination routing node is currently in an idle state and sends a transmission instruction to the optical buffer 201 and the switching switch. The optical buffer 201 receives the transmission instruction sent by the arbiter and sends the received optical signal to the switching switch according to the transmission instruction. The switching switch receives the transmission instruction sent by the arbiter and the optical signal that is received and that is sent by the optical buffer 201, turns on, according to the transmission instruction, the switching switch corresponding to the output port required by the destination routing node, and sends the optical signal received by the optical buffer 201 to the destination routing node using the transmission waveguide 203 corresponding to the output port required by the destination routing node.

If the arbiter determines that the output port required by the destination routing node has a transmission task, the arbiter determines that the output port required by the destination routing node is currently in a busy state, and sends a storage instruction to the optical buffer 201. The optical buffer 201 receives the storage instruction sent by the arbiter, and stores the optical signal in the optical buffer 201 according to the storage instruction. Until the arbiter determines that the output port required by the destination routing node changes to be in an idle state, the arbiter sends a transmission instruction to the optical buffer 201 and the switching switch. The optical buffer 201 receives the transmission instruction sent by the arbiter, acquires the stored optical signal, and sends the stored optical signal to the switching switch. The switching switch receives the transmission instruction sent by the arbiter and the optical signal that is stored in and that is sent by the optical buffer 201, turns on, according to the transmission instruction, the switching switch corresponding to the output port required by the destination routing node, and sends the stored optical signal to the destination routing node using the transmission waveguide 203 corresponding to the output port required by the destination routing node.

Figure 3:
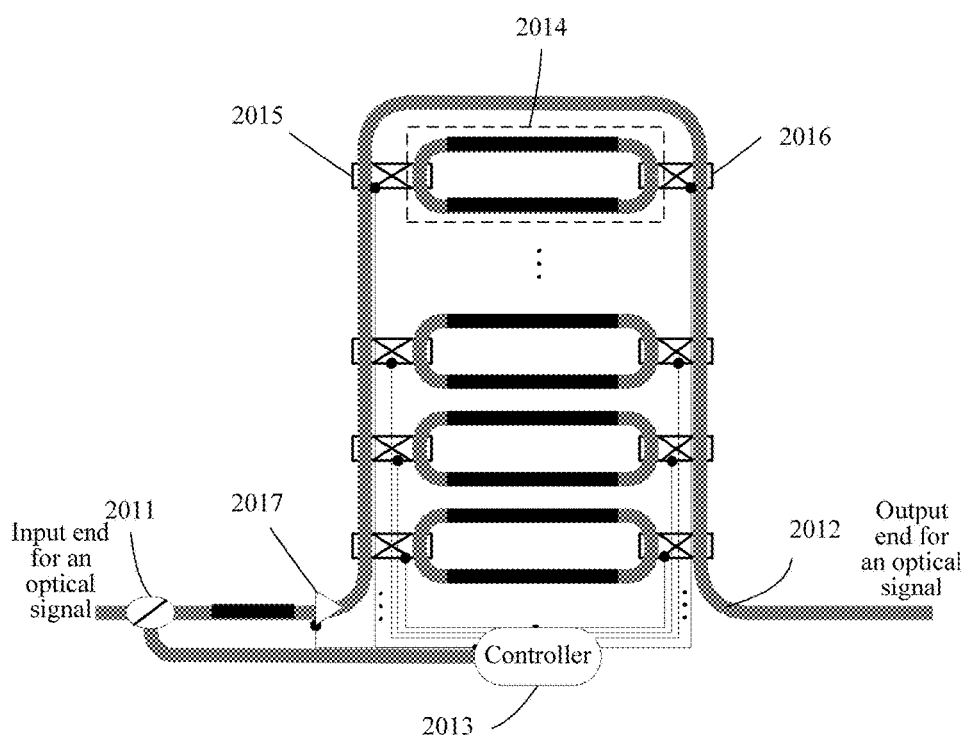
FIG. 3 is a schematic structural diagram of an optical buffer according to Embodiment 1 of the present disclosure.

Further, referring to FIG. 3, the optical buffer 201 includes: a beam splitter 2011, a bent straight-through waveguide 2012, a controller 2013, and multiple optical waveguide delay loops 2014, and a first optical switch 2015 and a second optical switch 2016 that correspond to each optical waveguide delay loop 2014 of the multiple optical waveguide delay loops 2014, where the bent straight-through waveguide 2012 is n-shaped; a first output end of the beam splitter 2011 is connected to an input end of the bent straight-through waveguide 2012, and an output end of the bent straight-through waveguide 2012 is connected to the switching node 202; a second output end of the beam splitter 2011 is connected to an input end of the controller 2013, and an output end of the controller 2013 is connected to the first optical switch 2015 and the second optical switch 2016 that correspond to each optical waveguide delay loop 2014; and each optical waveguide delay loop 2014 is connected to two arms of the bent straight-through waveguide 2012 using the first optical switch 2015 and the second optical switch 2016 that correspond to each optical waveguide delay loop; the beam splitter 2011 receives an optical signal, divides the optical signal into a first optical signal and a second optical signal, sends the first optical signal to the controller 2013, and sends the second optical signal to the bent straight-through waveguide 2012; and the controller 2013 parses the first optical signal, to obtain the identifier of the destination routing node, and sends the identifier of the destination routing node to the switching node 202; and when the switching node 202 determines that the output port required by the destination routing node is currently in an idle state, the controller 2013 sends the second optical signal to the switching node 202 using the bent straight-through waveguide 2012, such that the switching node 202 sends the second optical signal to the destination routing node using the transmission waveguide 203 corresponding to the output port required by the destination routing node; or when the switching node 202 determines that the output port required by the destination routing node is currently in a busy state, the controller 2013 selects an optical waveguide delay loop 2014, controls a first optical switch 2015 and a second optical switch that correspond to the optical waveguide delay loop 2014, and stores the second optical signal in the optical waveguide delay loop 2014, and until the output port required by the destination routing node changes to be in an idle state, the controller 2013 controls the second optical switch 2016 corresponding to the optical waveguide delay loop 2014 to send, to the switching node 202 using the bent straight-through waveguide 2012, the second optical signal stored in the optical waveguide delay loop 2014, such that the switching node 202 sends the second optical signal to the destination routing node using the transmission waveguide 203 corresponding to the output port required by the destination routing node.

Preferably, when the switching node 202 determines that the output port required by the destination routing node is currently in a busy state, the controller 2013 randomly selects an idle optical waveguide delay loop 2014 or selects an idle optical waveguide delay loop 2014 closest to the controller 2013; controls a first optical switch 2015 corresponding to the optical waveguide delay loop 2014 to be turned on and a second optical switch 2016 corresponding to the optical waveguide delay loop 2014 to be turned off, such that the second optical signal enters the optical waveguide delay loop 2014; and when the second optical signal completely enters the optical waveguide delay loop 2014, controls the first optical switch 2015 corresponding to the optical waveguide delay loop 2014 to be turned off, such that the second optical signal is circularly stored in the optical waveguide delay loop 2014.

Preferably, when the switching node 202 determines that the output port required by the destination routing node changes to be in an idle state, the controller 2013 controls the second optical switch 2016 corresponding to the optical waveguide delay loop 2014 to be turned on, such that the second optical signal stored in the optical waveguide delay loop 2014 enters the bent straight-through waveguide 2012 and is sent to the switching node 202 using the bent straight-through waveguide 2012.

The bent straight-through waveguide 2012 includes a slow light effect waveguide. The slow light effect waveguide can lower a transmission rate of the second optical signal, such that the switching node 202 can have enough time to determine whether the output port required by the destination routing node is currently in an idle state or a busy state.

Further, the controller 2013 includes an electrical-to-optical conversion unit and a processing unit; the second output end of the beam splitter 2011 is connected to an input end of the electrical-to-optical conversion unit, an output end of the electrical-to-optical conversion unit is connected to an input end of the processing unit, and an output end of the processing unit is connected to the input end of the switching node 202; the electrical-to-optical conversion unit receives the first optical signal sent by the beam splitter 2011, converts the first optical signal into a first electrical signal, and sends the first electrical signal to the processing unit; and the processing unit parses the first electrical signal, to obtain the identifier of the destination routing node, and sends the identifier of the destination routing node to the switching node 202; and when the switching node 202 determines that the output port required by the destination routing node is currently in an idle state, the processing unit sends the second optical signal to the switching node 202 using the bent straight-through waveguide 2012, such that the switching node 202 sends the second optical signal to the destination routing node using the transmission waveguide 203 corresponding to the output port required by the destination routing node; or when the switching node 202 determines that the output port required by the destination routing node is currently in a busy state, the processing unit controls a first optical switch 2015 and a second optical switch 2016 that correspond to an optical waveguide delay loop 2014, and stores the second optical signal in the optical waveguide delay loop 2014, and until the output port required by the destination routing node changes to be in an idle state, the processing unit controls the second optical switch 2016 corresponding to the optical waveguide delay loop 2014 to send, to the switching node 202 using the bent straight-through waveguide 2012, the second optical signal stored in the optical waveguide delay loop 2014, such that the switching node 202 sends the second optical signal to the destination routing node using the transmission waveguide 203 corresponding to the output port required by the destination routing node.

Preferably, when the switching node 202 determines that the output port required by the destination routing node is currently in a busy state, the processing unit sends a turn-on instruction to the first optical switch 2015 corresponding to the optical waveguide delay loop 2014, and sends a turn-off instruction to the second optical switch 2016 corresponding to the optical waveguide delay loop 2014. The first optical switch 2015 corresponding to the optical waveguide delay loop 2014 receives the turn-on instruction sent by the processing unit, and connects the bent straight-through waveguide 2012 to one end of the optical waveguide delay loop 2014 according to the turn-on instruction. The second optical switch 2016 corresponding to the optical waveguide delay loop 2014 receives the turn-off instruction sent by the processing unit, and disconnects another end of the optical waveguide delay loop 2014 from the bent straight-through waveguide 2012 according to the turn-off instruction, such that the second optical signal enters the optical waveguide delay loop 2014. When the second optical signal completely enters the optical waveguide delay loop 2014, a turn-off instruction is sent to the first optical switch 2015 corresponding to the optical waveguide delay loop 2014. The first optical switch 2015 corresponding to the optical waveguide delay loop 2014 receives the turn-off instruction sent by the processing unit, and disconnects the bent straight-through waveguide 2012 from the optical waveguide delay loop 2014 according to the turn-off instruction, such that the second optical signal is circularly stored in the optical waveguide delay loop 2014.

When the switching node 202 determines that the output port required by the destination routing node changes to be in an idle state, the processing unit sends a turn-on instruction to the second optical switch 2016 corresponding to the optical waveguide delay loop 2014. The second optical switch 2016 corresponding to the optical waveguide delay loop 2014 receives the turn-on instruction sent by the processing unit, and connects the bent straight-through waveguide 2012 to another end of the optical waveguide delay loop 2014 according to the turn-on instruction, and sends the second optical signal stored in the optical waveguide delay loop 2014 to the switching node 202 using the bent straight-through waveguide 2012, such that the switching node 202 sends the second optical signal to the destination routing node using the transmission waveguide 203 corresponding to the output port required by the destination routing node.

Further, the optical buffer 201 further includes an optical amplifier switch 2017; the first output end of the beam splitter 2011 is connected to one end of the optical amplifier switch 2017, and another end of the optical amplifier switch 2017 is connected to the input end of the bent straight-through waveguide 2012; and the beam splitter 2011 sends the second optical signal to the optical amplifier switch 2017, and the optical amplifier switch 2017 amplifies the second optical signal, and sends the amplified second optical signal to the bent straight-through waveguide 2012.

The second optical signal has an energy loss in a transmission process. To compensate for the loss, the optical amplifier switch 2017 is disposed in the buffer 201, so as to input the second optical signal to the bent straight-through waveguide 2012, to amplify the second optical signal, and input the amplified second optical signal to the bent straight-through waveguide 2012.

In this embodiment of the present disclosure, the routing node includes the switching node and the optical buffer, and relatively few components are required, which facilitates integration on a single chip. Moreover, in the routing node, the optical buffer performs parsing to obtain an identifier of a destination routing node, and the switching node determines whether an output port required by the destination routing node is currently in an idle state or a busy state, thereby implementing separation of control from arbitration, and simplifying circuit complexity of the switching node and the optical buffer.

Embodiment 2

Figure 4:
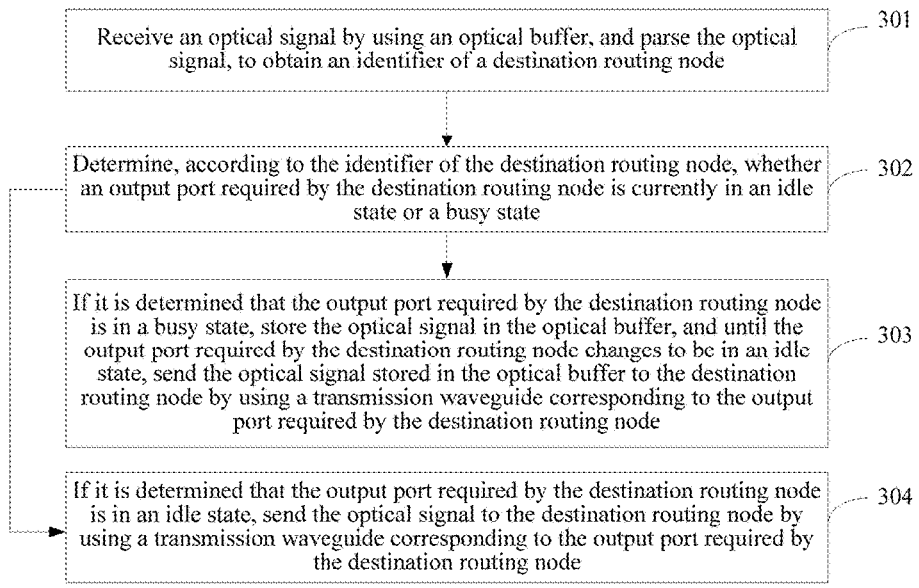
FIG. 4 is a flowchart of an optical signal transmission method according to Embodiment 2 of the present disclosure.

This embodiment of the present disclosure provides an optical signal transmission method. Referring to FIG. 4, the method includes:

Step 301: Receive an optical signal using an optical buffer, and parse the optical signal, to obtain an identifier of a destination routing node.

Step 302: Determine, according to the identifier of the destination routing node, whether an output port required by the destination routing node is currently in an idle state or a busy state.

Step 303: If it is determined that the output port required by the destination routing node is in a busy state, store the optical signal in the optical buffer, and until the output port required by the destination routing node changes to be in an idle state, send the optical signal stored in the optical buffer to the destination routing node using a transmission waveguide corresponding to the output port required by the destination routing node.

Step 304: If it is determined that the output port required by the destination routing node is in an idle state, send the optical signal to the destination routing node using a transmission waveguide corresponding to the output port required by the destination routing node.

In this embodiment of the present disclosure, if an output port required by a destination routing node is currently in a busy state, an optical signal is stored in an optical buffer. Until the output port required by the destination routing node changes to be in an idle state, the stored optical signal is sent to the destination routing node using a transmission waveguide corresponding to the output port required by the destination routing node, thereby improving utilization of network resources.

Embodiment 3

Figure 5:
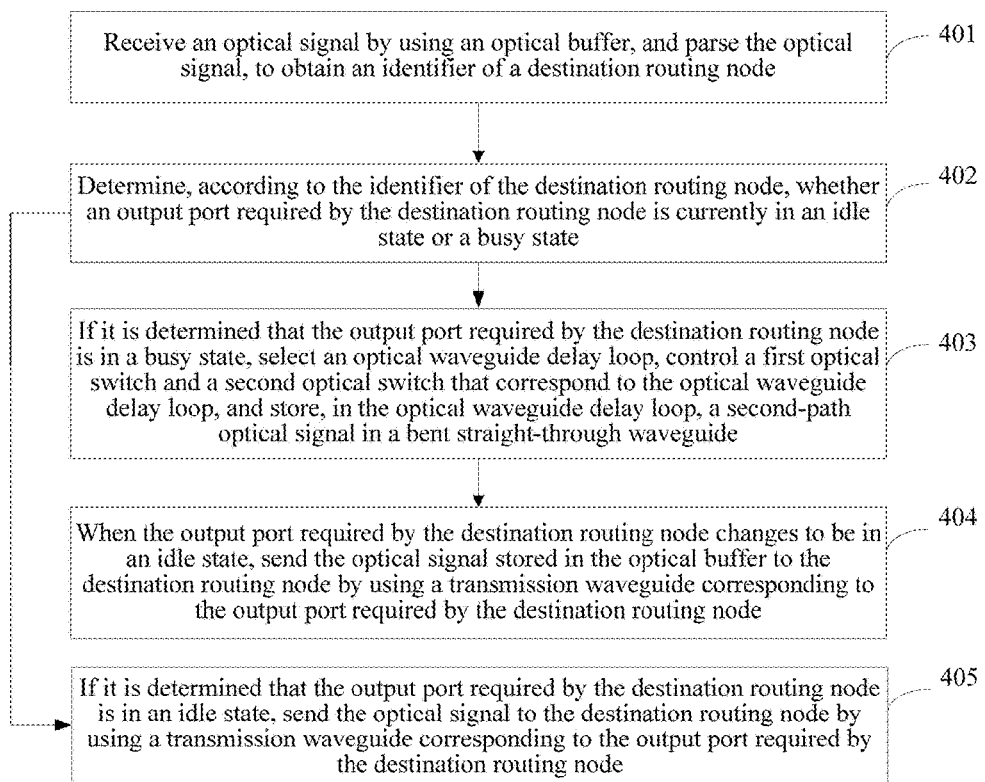
FIG. 5 is a flowchart of an optical signal transmission method according to Embodiment 3 of the present disclosure.

This embodiment of the present disclosure provides an optical signal transmission method. Referring to FIG. 5, the method includes:

Step 401: Receive an optical signal using an optical buffer, and parse the optical signal, to obtain an identifier of a destination routing node.

A signal source sends an optical signal to a local routing node, and the local routing node receives, using an optical buffer, the optical signal sent by the signal source.

The signal source may be another routing node except the local routing node, or the signal source may be a processor that can send an optical signal, or the like.

The step of parsing the optical signal, to obtain an identifier of a destination routing node includes the following steps (1) and (2):

(1): Perform beam splitting on the optical signal using a beam splitter, to obtain a first optical signal.

After the optical signal is received using the optical buffer, the optical signal is sent to the beam splitter. The beam splitter receives the optical signal, divides the optical signal into a first optical signal and a second optical signal, and sends the first optical signal to a controller, such that the controller determines, according to the first optical signal, whether an output port required by the destination routing node is currently in an idle state or a busy state. The beam splitter sends the second optical signal to a bent straight-through waveguide, such that the bent straight-through waveguide lowers a transmission rate of the second optical signal, so as to ensure that there is enough time to determine whether the output port required by the destination routing node is currently in an idle state or a busy state.

It should be noted that, the bent straight-through waveguide includes a slow light effect waveguide. The slow light effect waveguide can lower a transmission rate of the second optical signal.

The second optical signal has an energy loss in a transmission process. To compensate for the loss, an optical amplifier switch is disposed in the buffer, so as to input the second optical signal to the bent straight-through waveguide, to amplify the second optical signal, and input the amplified second optical signal to the bent straight-through waveguide.

(2): Convert the first optical signal into a first electrical signal, and parse the first electrical signal, to obtain the identifier of the destination routing node.

In this step, the controller receives the first optical signal, converts the first optical signal into the first electrical signal using an electrical-to-optical conversion unit included in the controller, and parses the first electrical signal using a processing unit included in the controller, to obtain the identifier of the destination routing node.

The identifier of the destination routing node may be a name or the like of the destination routing node.

Further, the controller generates a transmission request according to the identifier of the destination routing node and an identifier of the local routing node, sends the transmission request to a switching node, and performs step 402.

Step 402: Determine, according to the identifier of the destination routing node, whether an output port required by the destination routing node is currently in an idle state or a busy state; and if it is determined that the output port required by the destination routing node is in a busy state, perform step 403; or if it is determined that the output port required by the destination routing node is in an idle state, perform step 405.

Step 402 may include the following step (1) to step (3):

(1): Determine, according to the identifier of the destination routing node, whether the output port required by the destination routing node currently has a transmission task.

The switching node receives the transmission request sent by the controller, and determines, using an arbiter, whether the output port required by the destination routing node currently has a transmission task.

The step of determining, by an arbiter, whether the output port required by the destination routing node currently has a transmission task may be: adding, by the arbiter, the transmission task to a task table and determines whether the transmission task is the same as another transmission task in the task table except the transmission task; and if the transmission task is the same as another transmission task in the task table except the transmission task, determining, by the arbiter, that the output port required by the destination routing node currently has a transmission task; or if the transmission task is not the same as another transmission task in the task table except the transmission task, determining, by the arbiter, that the output port required by the destination routing node currently has no transmission task.

For example, the transmission task is: transmitting from a routing node 1 to a routing node 2. Tasks in the task table include: from the routing node 1 to the routing node 2, from the routing node 1 to a routing node 3, and from the routing node 1 to a routing node 4. After the transmission task is added to the task table, tasks in the task table include: from the routing node 1 to the routing node 2, from the routing node 1 to the routing node 3, from the routing node 1 to the routing node 4, and from the routing node 1 to the routing node 2. After querying the entire task table from the beginning, the arbiter determines that the first task is the same as the fourth task in the task table, and determines that the output port required by the destination routing node currently has a transmission task.

(2): If it is determined that the output port required by the destination routing node has no transmission task, determine that the output port required by the destination routing node is currently in an idle state.

(3): If it is determined that the output port required by the destination routing node has a transmission task, determine that the output port required by the destination routing node is currently in a busy state.

Step 403: Select an optical waveguide delay loop, control a first optical switch and a second optical switch that correspond to the optical waveguide delay loop, and store, in the optical waveguide delay loop, a second optical signal in a bent straight-through waveguide.

Step 403 may include the following step (1) and step (2):

(1): Select the optical waveguide delay loop, and control the first optical switch corresponding to the optical waveguide delay loop to be turned on and the second optical switch corresponding to the optical waveguide delay loop to be turned off, such that the second optical signal in the bent straight-through waveguide enters the optical waveguide delay loop.

Specifically, the controller may randomly select an idle optical waveguide delay loop, or may select an idle optical waveguide delay loop closest to the controller, and send a turn-on instruction to a first optical switch corresponding to the optical waveguide delay loop. The first optical switch corresponding to the optical waveguide delay loop receives the turn-on instruction sent by the controller, and connects the optical waveguide delay loop to the bent straight-through waveguide according to the turn-on instruction. The controller sends a turn-off instruction to the second optical switch corresponding to the optical waveguide delay loop. The second optical switch corresponding to the optical waveguide delay loop receives the turn-off instruction sent by the controller and disconnects the optical waveguide delay loop from the bent straight-through waveguide according to the turn-off instruction. The second optical signal in the bent straight-through waveguide enters the optical waveguide delay loop.

Further, after the second optical signal sent to the destination routing node is stored in the optical waveguide delay loop, an identifier of the optical waveguide delay loop and an identifier of the output port required by the destination routing node are stored in a correspondence between an identifier of an optical waveguide delay loop and an identifier of an output port required by a destination routing node.

Further, when the second optical signal is acquired from the optical waveguide delay loop, according to the identifier of the output port required by the destination routing node, the identifier of the optical waveguide delay loop in which the second optical signal is stored is acquired from the correspondence between an identifier of an optical waveguide delay loop and an identifier of an output port required by a destination routing node, and the second optical signal is acquired from the optical waveguide delay loop according to the acquired identifier of the optical waveguide delay loop.

The identifier of the optical waveguide delay loop may be a serial number of the optical waveguide delay loop, a location of the optical waveguide delay loop, or the like.

If there is no idle optical waveguide delay loop in the buffer, the controller discards the optical signal and sends a packet-discarded message to the signal source of the optical signal, such that the signal source sends the optical signal again in a next timeslot.

The optical waveguide delay loop not only can store the second optical signal, but also can lower the transmission rate of the second optical signal.

(2): When the second optical signal completely enters the optical waveguide delay loop, control the first optical switch corresponding to the optical waveguide delay loop to be turned off, such that the second optical signal is circularly stored in the optical waveguide delay loop.

Specifically, when the second optical signal completely enters the optical waveguide delay loop, the controller sends a turn-off instruction to the first optical switch corresponding to the optical waveguide delay loop. The first optical switch corresponding to the optical waveguide delay loop receives the turn-off instruction sent by the controller, and disconnects the optical waveguide delay loop from the bent straight-through waveguide according to the turn-off instruction. The second optical signal is circularly stored in the optical waveguide delay loop.

The controller controls the first optical switch corresponding to the optical waveguide delay loop to be turned on and the second optical switch corresponding to the optical waveguide delay loop to be turned off, such that timing is started when the second optical signal in the bent straight-through waveguide enters the optical waveguide delay loop, and after a preset time, it is determined that the second optical signal completely enters the optical waveguide delay loop.

The preset time may be set and changed according to a need. In this embodiment of the present disclosure, the preset time is not specifically limited.

Step 404: When the output port required by the destination routing node changes to be in an idle state, send the optical signal stored in the optical buffer to the destination routing node using a transmission waveguide corresponding to the output port required by the destination routing node, and end.

Step 404 includes the following step (1) and step (2):

(1): Control the second optical switch corresponding to the optical waveguide delay loop to be turned on, such that the second optical signal enters the bent straight-through waveguide from the optical waveguide delay loop and is transmitted from the bent straight-through waveguide to the transmission waveguide corresponding to the output port required by the destination routing node.

Specifically, the controller acquires, according to the identifier of the output port required by the destination routing node, the identifier of the optical waveguide delay loop from the correspondence between an identifier of an optical waveguide delay loop and an identifier of an output port required by a destination routing node, and sends, according to the identifier of the optical waveguide delay loop, the turn-on instruction to the second optical switch corresponding to the optical waveguide delay loop. The second optical switch corresponding to the optical waveguide delay loop receives the turn-on instruction sent by the controller, and connects the optical waveguide delay loop to the bent straight-through waveguide according to the turn-on instruction. In this case, the second optical signal is output from the optical waveguide delay loop and enters the bent straight-through waveguide. The bent straight-through waveguide is connected to the transmission waveguide corresponding to the output port required by the destination routing node. The second optical signal is transmitted, using the bent straight-through waveguide, to the transmission waveguide corresponding to the output port required by the destination routing node.

(2): Send the second optical signal to the destination routing node using the transmission waveguide corresponding to the output port required by the destination routing node.

Step 405: Send the optical signal to the destination routing node using a transmission waveguide corresponding to the output port required by the destination routing node.

Step 405 may include the following step (1) to step (4):

(1): Determine whether there is another optical signal that needs to be transmitted to the destination routing node in the optical buffer; and if there is no another optical signal that needs to be transmitted to the destination routing node in the optical buffer, perform step (2); or if there is the another optical signal that needs to be transmitted to the destination routing node in the optical buffer, perform step (3).

Specifically, the arbiter sends feedback information to the controller. The feedback information is executing the transmission task or storing the transmission task. The controller receives the feedback information sent by the arbiter, and determines whether there is another optical signal that needs to be transmitted to the destination routing node in the optical buffer. If there is no another optical signal that needs to be transmitted to the destination routing node in the optical buffer, the controller performs step (2). If there is another optical signal that needs to be transmitted to the destination routing node in the optical buffer, the controller performs step (3).

For example, the transmission task is: transmitting from the routing node 1 to the routing node 2, and the feedback information is transmitting an optical signal from the routing node 1 to the routing node 2. The controller determines whether there is another optical signal that needs to be transmitted to the routing node 2 in the buffer; and if there is another optical signal that needs to be transmitted to the routing node 2 in the buffer, the controller first stores the optical signal, and transmits another optical signal; or if there is no another optical signal that needs to be transmitted to the routing node 2 in the buffer, the controller transmits the optical signal.

(2) Send the optical signal to the destination routing node, and end.

(3): Store the optical signal in the optical buffer, acquire the another optical signal, and send the another optical signal to the destination routing node using the transmission waveguide corresponding to the output port required by the destination routing node.

The storing the optical signal in the optical buffer may include the following step (3-1) and step (3-2):

(3-1): Select an optical waveguide delay loop, control a first optical switch and a second optical switch that correspond to the optical waveguide delay loop, and store the optical signal in the optical waveguide delay loop.

This step is the same as (1) of step 403, and details are not described herein again.

(3-2): Acquire the another optical signal from the optical buffer.

According to the identifier of the output port required by the destination routing node, an identifier of an optical waveguide delay loop in which the another optical signal is stored is acquired from the correspondence between an identifier of an optical waveguide delay loop and an identifier of an output port required by a destination routing node. According to the acquired identifier of the optical waveguide delay loop, a second optical switch corresponding to the acquired optical waveguide delay loop is controlled to be turned on, such that the another optical signal enters the bent straight-through waveguide from the acquired optical waveguide delay loop and is transmitted by the bent straight-through waveguide to the transmission waveguide corresponding to the output port required by the destination routing node.

(4): After the another optical signal is sent completely, send the stored optical signal to the destination routing node using the transmission waveguide corresponding to the output port required by the destination routing node.

This step is the same as step 404, and details are not described herein again.

In this embodiment of the present disclosure, if an output port required by a destination routing node is currently in a busy state, an optical signal is stored in an optical buffer. Until the output port required by the destination routing node changes to be in an idle state, the stored optical signal is sent to the destination routing node using a transmission waveguide corresponding to the output port required by the destination routing node, thereby improving utilization of network resources.

Embodiment 4

Figure 6:
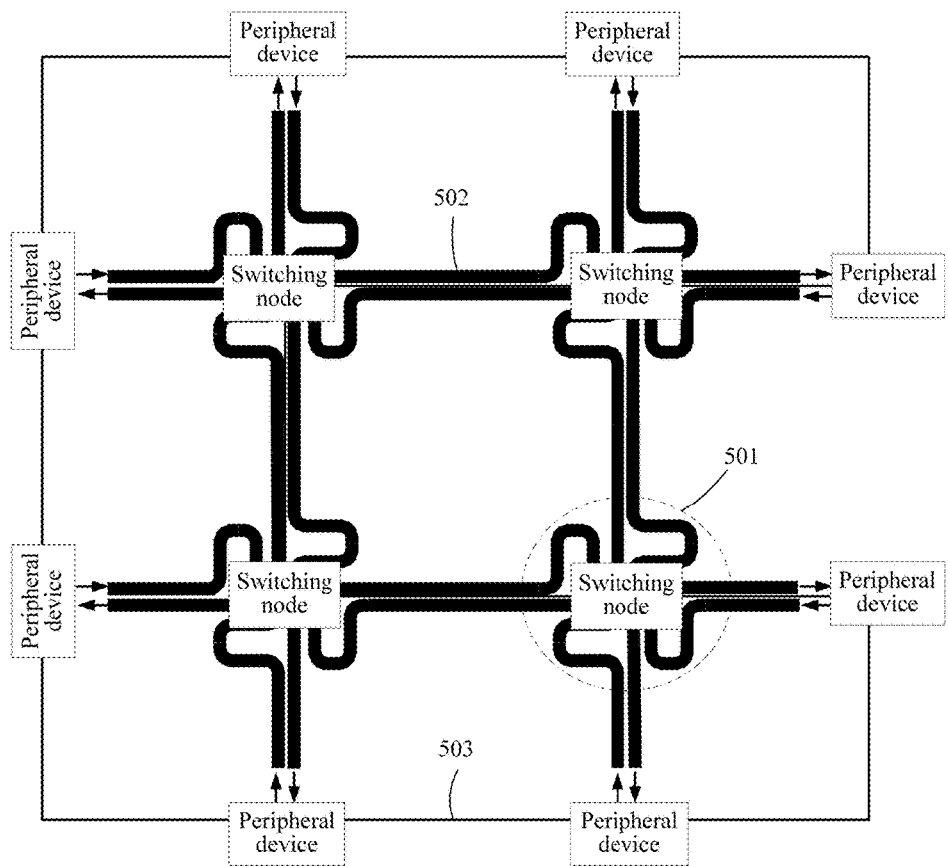
FIG. 6 is a schematic structural diagram of an optical switching network according to Embodiment 4 of the present disclosure.

This embodiment of the present disclosure provides an optical switching network. Referring to FIG. 6, the optical switching network includes multiple routing nodes 501 and a transmission waveguide 502, where the multiple routing nodes are interconnected using the transmission waveguide, to form a required topology structure.

Further, the optical switching network further includes an electrical bus 503; and the multiple routing nodes are connected to a peripheral device using the electrical bus 503.

The required topology structure may be a topology structure such as a crossbar (a crossbar matrix), a mesh (a wireless grid network), or a torus (a torus). The peripheral device may be a processor or the like.

In this embodiment of the present disclosure, a routing node includes a switching node and an optical buffer, and relatively few components are required, which facilitates integration on a single chip. Moreover, in the routing node, the optical buffer performs parsing to obtain an identifier of a destination routing node, and the switching node determines whether an output port required by the destination routing node is currently in an idle state or a busy state, thereby implementing separation of control from arbitration, and simplifying circuit complexity of the switching node and the optical buffer.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, or an optical disc.

The foregoing descriptions are merely exemplary embodiments of the present disclosure, but are not intended to limit the present disclosure. Any modification, equivalent replacement, and improvement made without departing from the spirit and principle of the present disclosure shall fall within the protection scope of the present disclosure.

What is claimed is:

1. A routing node comprises:
   a transmission waveguide;
   an optical buffer that includes an optical buffer output end and configured to:
      receive an optical signal; and
      parse the optical signal to obtain an identifier of a destination routing node; and
   a switching node that includes a switching node output end coupled to the transmission waveguide and a switching node input end coupled to the optical buffer output end, the switching node further includes a switch and an arbiter, the switch including a switch first end coupled to the optical buffer output end and a switch second end coupled to the transmission waveguide, and the arbiter including an arbiter input end coupled to the optical buffer output end and an arbiter output end coupled to the switch first end, the arbiter configured to:
      receive the identifier from the optical buffer;
      determine, according to the identifier, whether an output port required by the destination routing node is in an idle state or a busy state;
      control the optical buffer to store the optical signal when the output port is in a busy state; and
      send the optical signal to the destination routing node using the transmission waveguide when the output port is in an idle state,
   wherein the transmission waveguide corresponds to the output port.

2. The routing node of claim 1, wherein the optical buffer comprises:
   a bent straight-through waveguide including a bent straight-through waveguide output end coupled to the switching node, bent straight-through waveguide arms, a bent straight-through waveguide input end;
   optical waveguide delay loops;
   a pair of a first optical switch and a second optical switch corresponding to each optical waveguide delay loop and coupling each optical waveguide delay loop to the bent straight-through waveguide arms;
   a beam splitter including a beam splitter first output end coupled to the bent straight-through waveguide input end and a beam splitter second output end, wherein the beam splitter is configured to:
      perform the receiving the optical signal;
      divide the optical signal into a first optical signal and a second optical signal; and
      send the second optical signal to the bent straight-through waveguide; and
   a controller including a controller input end coupled to the beam splitter second output end and a controller output end coupled to the pairs, wherein the controller is configured to:
      receive the first optical signal from the beam splitter;
      perform the parsing;
      send the identifier to the switching node;
      send the second optical signal to the switching node using the bent straight-through waveguide when the output port is in the idle state; and
      select a first optical waveguide delay loop, control the pair corresponding to the first optical waveguide delay loop, and store the second optical signal in the first optical waveguide delay loop when the output port is in the busy state.

3. The routing node of claim 2, wherein the controller further comprises:
   an electrical-to-optical converter including an electrical-to-optical converter input end coupled to the beam splitter second output end and an electrical-to-optical converter output end, wherein the electrical-to-optical converter is configured to:
      receive the first optical signal from the beam splitter; and
      convert the first optical signal into a first electrical signal; and
   a processor including processor input end coupled to the electrical-to-optical converter output end and a processor output end coupled to the switching node input end, wherein the processor is configured to:
      receive the first electrical signal from the electrical-to-optical converter;
      parse the first electrical signal to obtain the identifier;
      send the identifier to the switching node;

send the second optical signal to the switching node using the bent straight-through waveguide when the output port is in the idle state; and control the pair corresponding to the first optical waveguide delay loop and store the second optical signal in the first optical waveguide delay loop when the output port is in the busy state.

4. The routing node of claim 2, wherein the optical buffer further comprises an optical amplifier switch, wherein the optical amplifier switch includes an optical amplifier switch first end coupled to the beam splitter first output end and an optical amplifier switch second end coupled to the bent straight-through waveguide input end, wherein the optical amplifier switch is configured to:

receive the second optical signal from the beam splitter;

amplify the second optical signal to create an amplified second optical signal; and send the amplified second optical signal to the bent straight-through waveguide.

5. An optical signal transmission method comprising:

receiving an optical signal using an optical buffer, parsing the optical signal to obtain an identifier of a destination routing node;

determining, according to the identifier, whether an output port required by the destination routing node is in an idle state or a busy state;

storing the optical signal in the optical buffer when the output port is in a busy state by:

performing, using a beam splitter, beam splitting on the optical signal to obtain another optical signal;

inputting the another optical signal to a bent straight-through waveguide so that the bent straight-through waveguide lowers a transmission rate of the another optical signal;

selecting an optical waveguide delay loop;

controlling a first optical switch and a second optical switch that correspond to the optical waveguide delay loop; and storing the another optical signal in the optical waveguide delay loop; and sending the optical signal to the destination routing node using a transmission waveguide corresponding to the output port when the output port is in an idle state.

6. The optical signal transmission method of claim 5, wherein the determining whether the output port is in the idle state or the busy state comprises:

determining, according to the identifier, whether the output port has a transmission task;

determining that the output port is in the idle state when the output port does not have the transmission task; and determining that the output port is in the busy state when the output port has the transmission task.

7. The optical signal transmission method of claim 5, wherein the parsing the optical signal comprises:

converting the optical signal into a first electrical signal; and parsing the first electrical signal to obtain the identifier.

8. The optical signal transmission method of claim 5, wherein the controlling the first optical switch and the second optical switch and the storing the second optical signal comprise:

controlling the first optical switch to be turned on and the second optical switch to be turned off such that the second optical signal enters the optical waveguide delay loop; and controlling, when the second optical signal completely enters the optical waveguide delay loop, the first optical switch to be turned off so that the second optical signal is circularly stored in the optical waveguide delay loop.

9. The optical signal transmission method of claim 5, wherein the sending the optical signal comprises:

controlling the second optical switch to be turned on so that the second optical signal enters the bent straight-through waveguide from the optical waveguide delay loop and is transmitted by the bent straight-through waveguide to the transmission waveguide; and sending the second optical signal to the destination routing node using the transmission waveguide.

10. The optical signal transmission method of claim 5, wherein before the inputting the second optical signal to the bent straight-through waveguide, the method further comprises amplifying the second optical signal.

11. The optical signal transmission method of claim 5, wherein the sending the optical signal to the destination routing node comprises:

sending the optical signal to the destination routing node when there is not an additional optical signal that needs to be transmitted to the destination routing node; and when there is the additional optical signal that needs to be transmitted to the destination routing node, storing the optical signal in the optical buffer, acquiring the additional optical signal, sending the additional optical signal to the destination routing node using the transmission waveguide, and sending the optical signal to the destination routing node using the transmission waveguide after sending the additional optical signal.

12. The optical signal transmission method of claim 5, further comprises sending a packet-discarded message to a signal source of the optical signal so that the signal source sends the optical signal again when the another optical signal fails to be stored.

13. An optical switching network comprises:

a plurality of routing nodes, wherein each routing node includes:

a transmission waveguide;

an optical buffer including an optical buffer output end and configured to:

receive an optical signal; and parse the optical signal to obtain an identifier of a destination routing node; and a switching node including a switching node output end coupled to the transmission waveguide and a switching node input end coupled to the optical buffer output end, wherein the switching node further includes a switch and an arbiter, the switch including a switch first end coupled to the optical buffer output end and a switch second end coupled to the transmission waveguide, and the arbiter including an arbiter input end coupled to the optical buffer output end and an arbiter output end coupled to the switch first end, the arbiter configured to:

receive the identifier from the optical buffer;

determine, according to the identifier, whether an output port required by the destination routing node is in an idle state or a busy state;

control the optical buffer to store the optical signal when the output port is in a busy state; and send the optical signal to the destination routing node using the transmission waveguide when the output port is in an idle state, wherein the transmission waveguide corresponds to the output port.

14. The optical switching network of claim 13, wherein the optical buffer comprises:

a bent straight-through waveguide including a bent straight-through waveguide output end coupled to the switching node, bent straight-through waveguide arms, a bent straight-through waveguide input end;
optical waveguide delay loops;
a pair of a first optical switch and a second optical switch corresponding to each optical waveguide delay loop and coupling each optical waveguide delay loop to the bent straight-through waveguide arms;
a beam splitter including a beam splitter first output end coupled to the bent straight-through waveguide input end and a beam splitter second output end, wherein the beam splitter is configured to:
perform the receiving the optical signal;
divide the optical signal into a first optical signal and a second optical signal; and
send the second optical signal to the bent straight-through waveguide; and
a controller including a controller input end coupled to the beam splitter second output end and a controller output end coupled to the pairs, wherein the controller is configured to:
receive the first optical signal from the beam splitter;
perform the parsing;
send the identifier to the switching node;
send the second optical signal to the switching node using the bent straight-through waveguide when the output port is in the idle state; and
select a first optical waveguide delay loop, control the pair corresponding to the first optical waveguide delay loop, and store the second optical signal in the first optical waveguide delay loop when the output port is in the busy state.

15. The optical switching network of claim 14, wherein the controller further comprises:
an electrical-to-optical converter including an electrical-to-optical converter input end coupled to the beam splitter second output end and an electrical-to-optical converter output end, wherein the electrical-to-optical converter is configured to:
receive the first optical signal from the beam splitter; and
convert the first optical signal into a first electrical signal; and
a processor including processor input end coupled to the electrical-to-optical converter output end and a processor output end coupled to the switching node input end, wherein the processor is configured to:
receive the first electrical signal from the electrical-to-optical converter;
parse the first electrical signal to obtain the identifier;
send the identifier to the switching node;
send the second optical signal to the switching node using the bent straight-through waveguide when the output port is in the idle state; and
control the pair corresponding to the first optical waveguide delay loop and store the second optical signal in the first optical waveguide delay loop when the output port is in the busy state.

16. The optical switching network of claim 14, wherein the optical buffer further comprises an optical amplifier switch, and wherein the optical amplifier switch includes an optical amplifier switch first end coupled to the beam splitter first output end, and an optical amplifier switch second end coupled to the bent straight-through waveguide input end, the optical amplifier switch configured to:
receive the second optical signal from the beam splitter;
amplify the second optical signal to create an amplified second optical signal; and
send the amplified second optical signal to the bent straight-through waveguide.

17. The optical switching network of claim 13, further comprises an electrical bus configured to couple the plurality of routing nodes to a peripheral device.

* * * * *